(12) United States Patent
Murray, Jr.

(10) Patent No.: US 6,778,380 B2
(45) Date of Patent: Aug. 17, 2004

(54) TV MUTE FINGER RING

(76) Inventor: William P Murray, Jr., 249 Seaview Ave., San Rafael, CA (US) 94901

( * ) Notice: Subject to any disclaimer, the term of this patent is extended or adjusted under 35 U.S.C. 154(b) by 0 days.

(21) Appl. No.: 10/138,828

(22) Filed: May 6, 2002

(65) Prior Publication Data

US 2003/0206393 A1 Nov. 6, 2003

(51) Int. Cl.$^7$ ................................................. G06F 1/16
(52) U.S. Cl. ........................ 361/679; 341/176; 348/734; 398/106; 345/158; 340/825.24
(58) Field of Search ......................... 361/679; 341/176, 341/20, 22; 398/106, 112; 345/156–159, 179, 153; 348/734; 340/825.1–69, 825–825.96

(56) References Cited

U.S. PATENT DOCUMENTS

| | | | | |
|---|---|---|---|---|
| 4,045,777 A | * | 8/1977 | Mierzwinski et al. | ........ 398/112 |
| 4,517,424 A | * | 5/1985 | Kroczynski | ................... 341/22 |
| 4,905,001 A | * | 2/1990 | Penner | ......................... 341/20 |
| 4,954,817 A | * | 9/1990 | Levine | ........................ 345/179 |
| 5,481,265 A | * | 1/1996 | Russell | ........................ 341/22 |
| 5,489,922 A | * | 2/1996 | Zloof | .......................... 345/156 |
| 5,926,168 A | * | 7/1999 | Fan | .............................. 345/158 |
| 6,184,863 B1 | * | 2/2001 | Sibert et al. | ................. 345/156 |

* cited by examiner

Primary Examiner—Lisa Lea-Edmonds
(74) Attorney, Agent, or Firm—Michael A. Shippey

(57) ABSTRACT

TV Mute Finger Ring with a hollow C shaped finger ring housing. The housing contains the standard electronics and IR transmitting LED associated with activating the mute function of a standard TV. The housing also contains a battery type electrical power source. The C shaped ring housing has a loop type fastener strip attached to one end of the C shape and a hook type fastening panel affixed to the opposite end of the C shape so that said loop type fastener can removably attach to said hook fastener thereby forming a full ring that can be worn on the user's forefinger. The C shaped housing contains a momentary on-off switch and attached outwardly accessible switch cover located in a position where the user's thumb can easily reach said switch cover. The IR transmitter is covered by a transparent plastic lens that is flush with the outer surface of said C shaped housing. The plastic lens is positioned so that said lens and said IR transmitting LED are pointed outwardly in the general direction of said TV.

3 Claims, 3 Drawing Sheets

TV MUTE FINGER RING

BACKGROUND OF THE INVENTION

Figure 1:
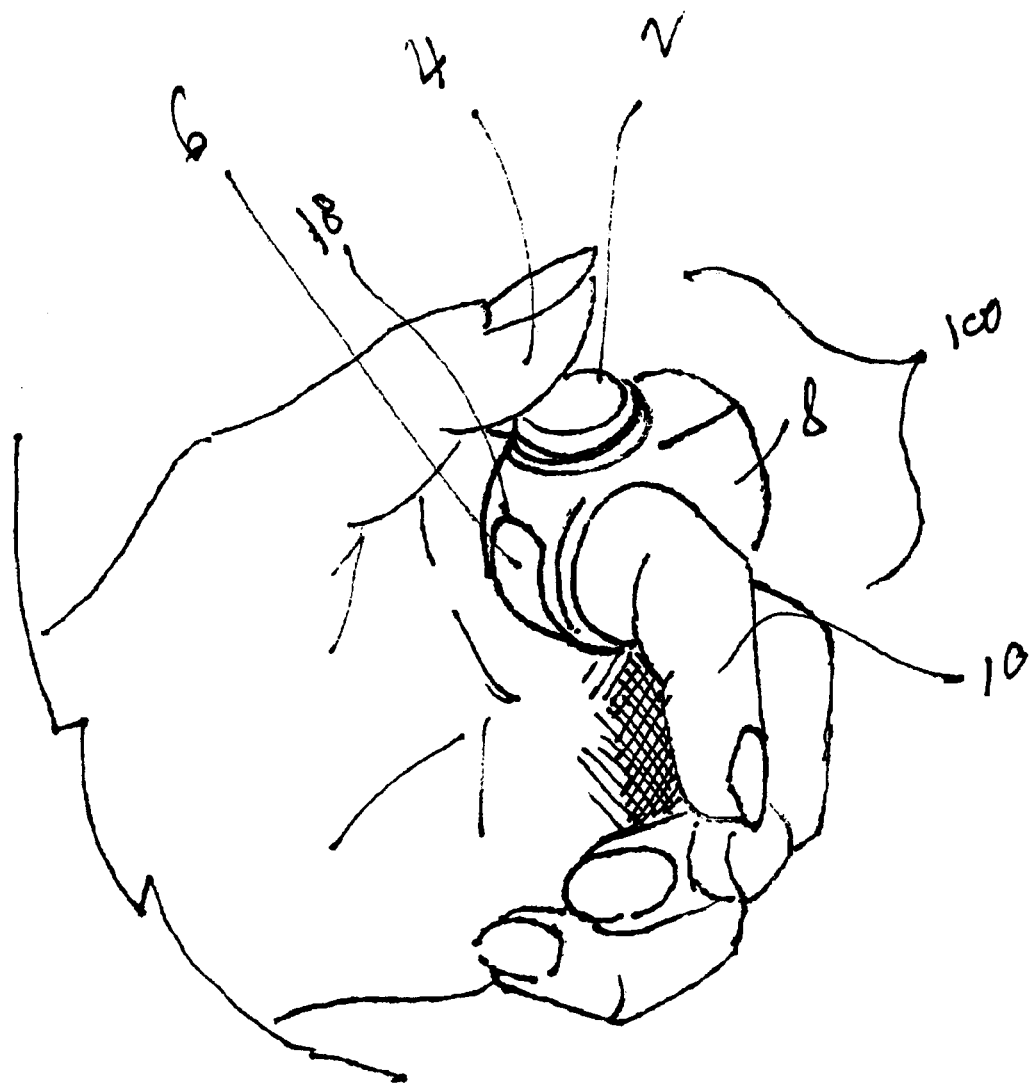

This invention relates generally to the field of TV accessories, and more particularly to a TV Mute Finger Ring.

Remote control devices for activating and controlling a standard TV are well known. Such devices tend to use IR type LED emitters that send a signal to an IR receiver located on the front panel of a standard TV. Standard commands include On-off, volume, channel selection and Mute. The Mute switch turns off all sound from the TV. Many TV user's tend to turn off the sound coming from the TV when an advertising commercial appears. They do this because many times the sound emitted during a commercial is louder than the normal TV program sound. User's may also want to turn off the sound temporarily to communicate with a nearby person, or to answer a telephone or any other instance when the TV sound may be temporarily undesirable. In this case, the user must find the remote device locate the mute button and then press the button. This operation must be repeated when turning the sound back on. Unfortunately, the process of finding the remote device, turning on an available light source to locate the rather small mute button and finally pressing the mute button can take almost as long as the time of a standard TV commercial thereby making the process irrelevant. TV remote devices that are built into wrist watches have been developed in the recent past. Although these devices do help a user have convenient use of a mute feature, they tend to be rather costly and the mute button is very small, making it almost impossible to use the device without looking carefully at it. Additionally, the user must turn and lift his or her arm and wrist in the direction of the TV set for the wrist mounted device to work. In general, the wrist mounted TV remote devices available today are rather awkward and difficult to use.

SUMMARY OF THE INVENTION

The primary object of the invention is to provide a mute switch for a TV that is quick and easy to access.

Another object of the invention is to provide a mute switch for a TV that can be operated by one hand.

Another object of the invention is to provide a mute switch for a TV where the user does not have to visually see the mute switch in order to operate it.

Another object of the invention is to provide a mute switch for a TV that is economical to manufacture.

Other objects and advantages of the present invention will become apparent from the following descriptions, taken in connection with the accompanying drawings, wherein, by way of illustration and example, an embodiment of the present invention is disclosed.

TV Mute Finger Ring comprising: a hollow C shaped finger ring housing, said housing containing the standard electronics and IR transmitting LED associated with activating the mute function of a standard TV, said housing also containing a battery type electrical power source, said C shaped ring housing having a loop type fastener strip attached to one end of said C shape and a hook type fastening panel affixed to the opposite end of said C shape so that said loop type fastener can removably attach to said hook fastener thereby forming a full ring that can be worn on the user's forefinger, said C shaped housing containing a momentary on-off switch and attached outwardly accessible switch cover located in a position where the user's thumb can easily reach said switch cover, said IR transmitter being covered by a transparent plastic lens that is flush with the outer surface of said C shaped housing, and said plastic lens positioned so that said lens and said IR transmitting LED are pointed outwardly in the general direction of said TV.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
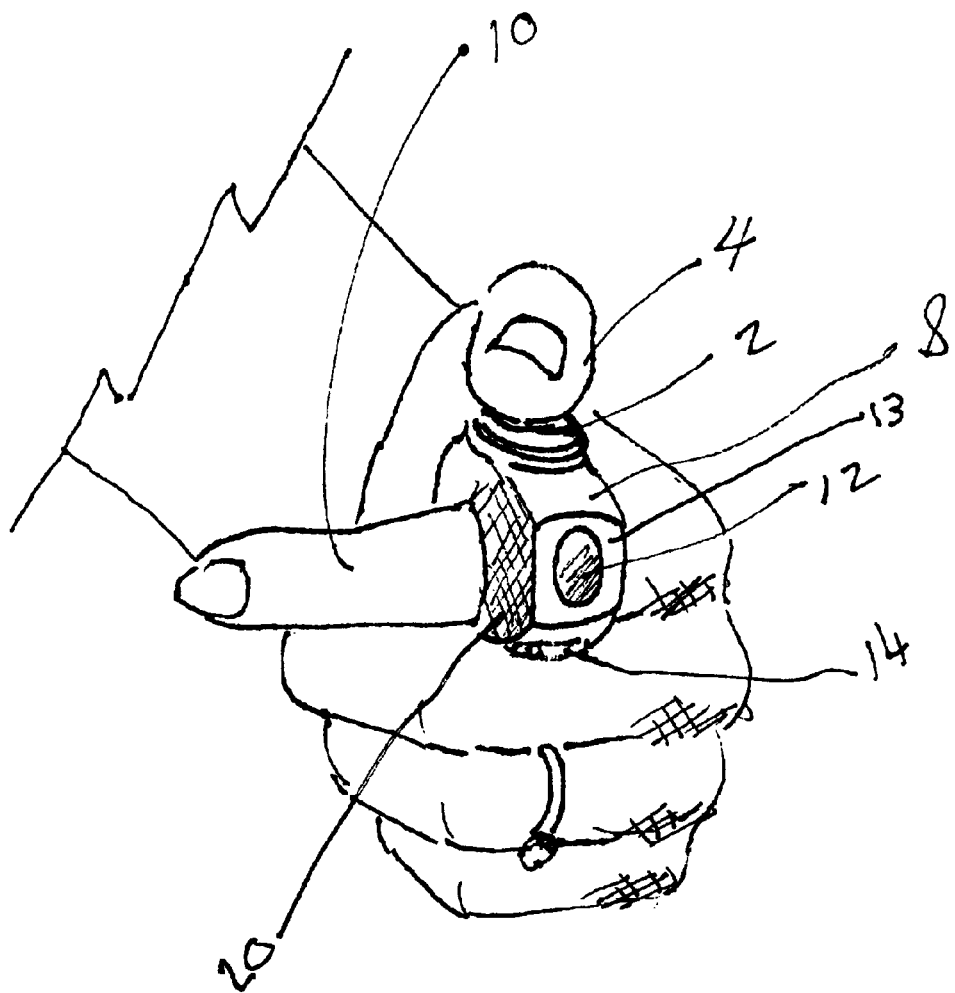
Figure 3:
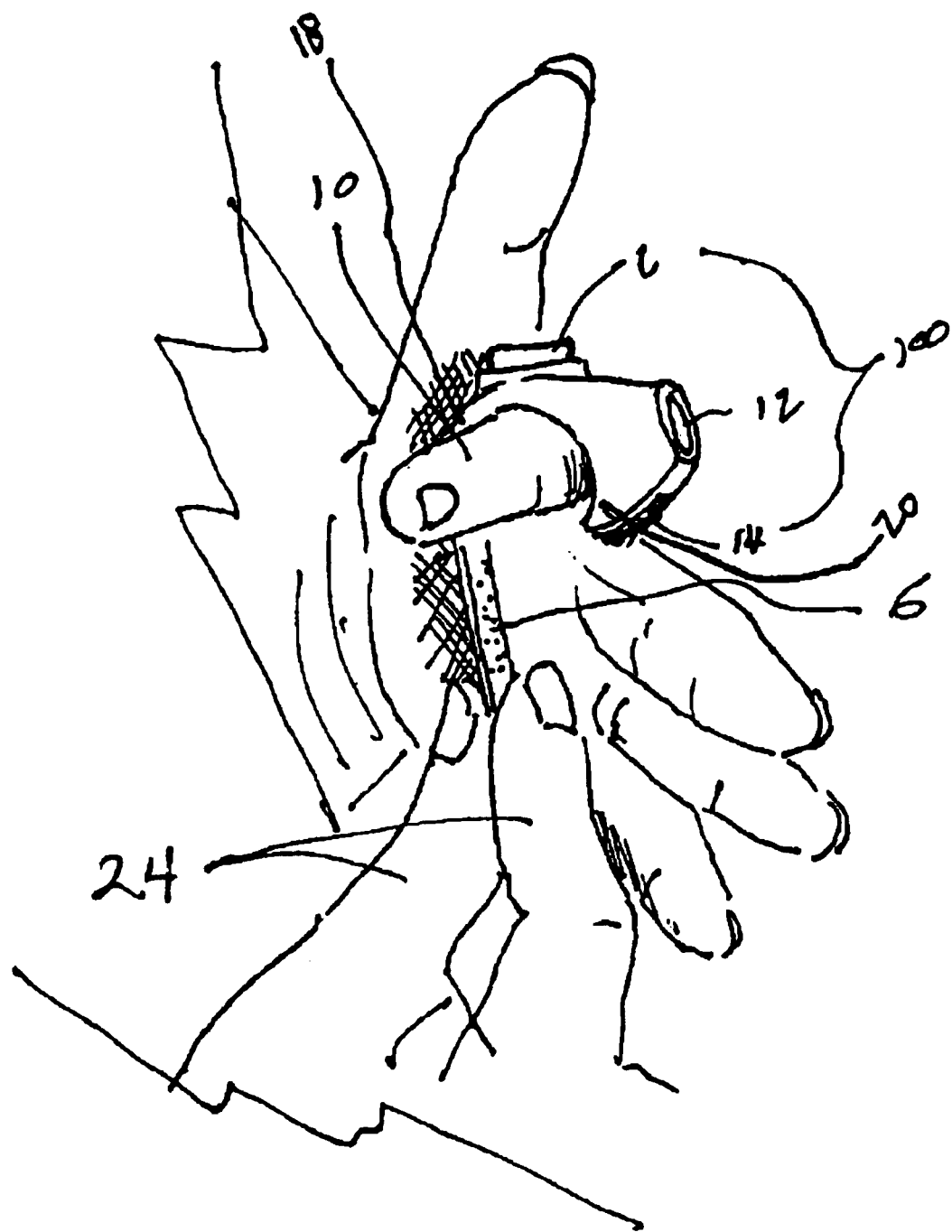

Referring now to FIG. 1 we see a perspective view of The TV mute ring of the present invention 100. The ring housing 8 fits comfortably on the user's forefinger 10. The ring assembly is positioned so that a push button switch cover 2 of an internal momentary on-off switch is easily accessible by the user's thumb 4. The ring housing 8 is hollow and is preferably made of rigid, injection molded plastic such as ABS or the like. FIG. 2 shows a front perspective view of the present invention 100. In this view an IR lens 12 can be clearly seen. Within housing 8 is contained a standard circuit for transmitting an IR signal to a standard IR receiver located within a standard TV set. The IR signal exits through said lens 12, which is flush with the front surface 13 of ring housing 8. Also included in housing 8 is a power source such as a button type DC battery. With the present invention 100, the user can easily and quickly create a muted condition with respect to a standard TV set. The operation can be done by one hand and without physically looking at the mute ring to perform the action. Since the ring is removably attached to the user's finger, it can not be easily lost or otherwise misplaced. FIG. 3 shows a person installing the present invention 100 onto his or her finger 10. A flexible strip 6 of loop type fastening material is fixedly attached to one end 18 of the C shaped ring housing 8 and hook type fastening material Cs fixedly attached to the opposite end 20 of the C shaped ring housing 8. The user grabs strip 6 by fingers 24 and wraps it around the underside of finger 10 and fastens strip 6 to loop material 14 located on opposite C shaped end 20. In this way, the TV mute ring of the present invention 100 can snuggly fit a wide variety of finger sizes. Since the ring 100 provides a single function and is relatively small in size, it can be manufactured inexpensively and therefore be sold at a reasonable price.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. TV Mute Finger Ring comprising:

a hollow C shaped finger ring housing;

said housing containing the standard electronics and IR-transmitting LED associated with activating the mute function of standard TV;

said housing also containing a battery type electrical power source;

said C shaped ring housing having a loop type fastener strip attached to one end of said C shaped ring housing and a hook type fastening panel affixed to the opposite end of said C shaped ring housing so that said loop type fastener can removable attach to said hook fastener thereby forming a full ring that can be worn on the user's forefinger;

said C shaped ring housing containing a momentary volume on-off switch and attached outwardly accessible switch cover located in a position where the user's thumb can easily reach said switch cover;

said IR transmitter being covered by a transparent plastic lens that is flush with the outer surface of said C shaped ring housing; and said plastic lens positioned so that said lens and said IR transmitting LED are pointed outwardly in the general direction of said TV.

2. A TV mute ring as described in claim 1, wherein said volume on-off switch is located on top of said ring housing, in such a position that a TV viewer's thumb will naturally fall on or near said switch when said viewer is wearing the ring, in a normal position with said IR window facing forward in the general direction of said TV.

3. A TV mute ring as described in claim 1, wherein said volume on-off switch is a push button switch.

\* \* \* \* \*